(12) United States Patent
Lo

(10) Patent No.: US 6,948,877 B1
(45) Date of Patent: Sep. 27, 2005

(54) STRIDING SHANK FIXING DEVICE

(76) Inventor: Albert Chong-Jen Lo, 3023, Windy Knoll Ct., Rockville, MD (US) 20850

(*) Notice: Subject to any disclaimer, the term of this patent is extended or adjusted under 35 U.S.C. 154(b) by 32 days.

(21) Appl. No.: 10/806,147

(22) Filed: Mar. 23, 2004

(51) Int. Cl.$^7$ ............................................... F16B 7/10
(52) U.S. Cl. ...................... 403/108; 403/107; 403/362; 248/229.12; 248/229.22; 248/231.41; 248/518; 248/534
(58) Field of Search ........................ 248/229.1, 229.12, 248/229.14, 229.22, 229.24, 511, 518, 534, 248/540; 403/107, 108, 362

(56) References Cited

U.S. PATENT DOCUMENTS

| | | | |
|---|---|---|---|
| 140,747 A * | 7/1873 | Walker | 269/215 |
| 540,555 A * | 6/1895 | Mader | 269/215 |
| 1,145,514 A * | 7/1915 | Schiek et al. | 269/97 |
| 2,446,282 A * | 8/1948 | Hart | 248/515 |
| 5,172,885 A * | 12/1992 | Kreischer | 248/539 |

* cited by examiner

Primary Examiner—Daniel P. Stodola
Assistant Examiner—Michael P. Ferguson
(74) Attorney, Agent, or Firm—Bacon & Thomas PLLC

(57) ABSTRACT

A striding shank fixing device includes an insert tube, a guide tube, and an adjusting member. The guide tube has plural position holes, and the adjusting member has a hole for the guide tube to pass through and a position projection to fit in one of the position holes to secure the adjusting member with the guide tube at an adjusted location. A thumb screw screws through the adjusting member to press a driving strip to push forcefully against a vertical side of a wall to secure the shank fixing device striding on the wall so the shank of a parasol may be inserted in the insert tube and stabilized by a thumb screw screwing through the insert tube and pressing against a driving block in the insert tube and pressing against the shank to support the parasol stably.

2 Claims, 6 Drawing Sheets

STRIDING SHANK FIXING DEVICE

BACKGROUND OF THE INVENTION

1. Field of the Invention

This invention relates to a striding shank fixing device, particularly to one possible to stride and fix on a vertical wall and adjustable its position according to the thickness of the wall where the device is secured on.

2. Description of the Prior Art

A shank-fixing device is used for a flagpole or a shank of a parasol, generally to stand on the ground and expanded thereon, having an insert tube in the upper side for a shank or pole to be inserted from above downward and then fixed at a proper height. This kind of fixing device in the spread condition sits on the ground, taking rather a large area, and resulting in wasting the space. Further, passersby may carelessly collide with it and force it to fall down, and it is possible to accidentally hurt someone.

SUMMARY OF THE INVENTION

This invention has been devised to offer a striding shank fixing device so as to improve the conventional shank-fixing frame sitting on the ground for supporting a flagpole or a parasol.

The feature of the invention is a guide tube fixed outside of a insert tube and having plural position holes, and an adjusting member having a hole for the guide tube to pass through and a position projection to fit in any of the position holes of the guide tube to secure the adjusting member at one of many adjustable locations relative to the guide tube. Further, a thumb screw screws through the adjusting member to press a driving strip to move synchronously against a vertical surface of a wall. The insert tube is located at the other vertical surface of the wall and a thumbscrew screws into the insert tube to press a driving block in the insert tube to push against the shank of a parasol inserted in the insert tube keep the shank immovable. Then the striding shank fixing device may be secured stably and striding on the wall of any thickness by adjusting the position of the adjustable member relative to the guide tube.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
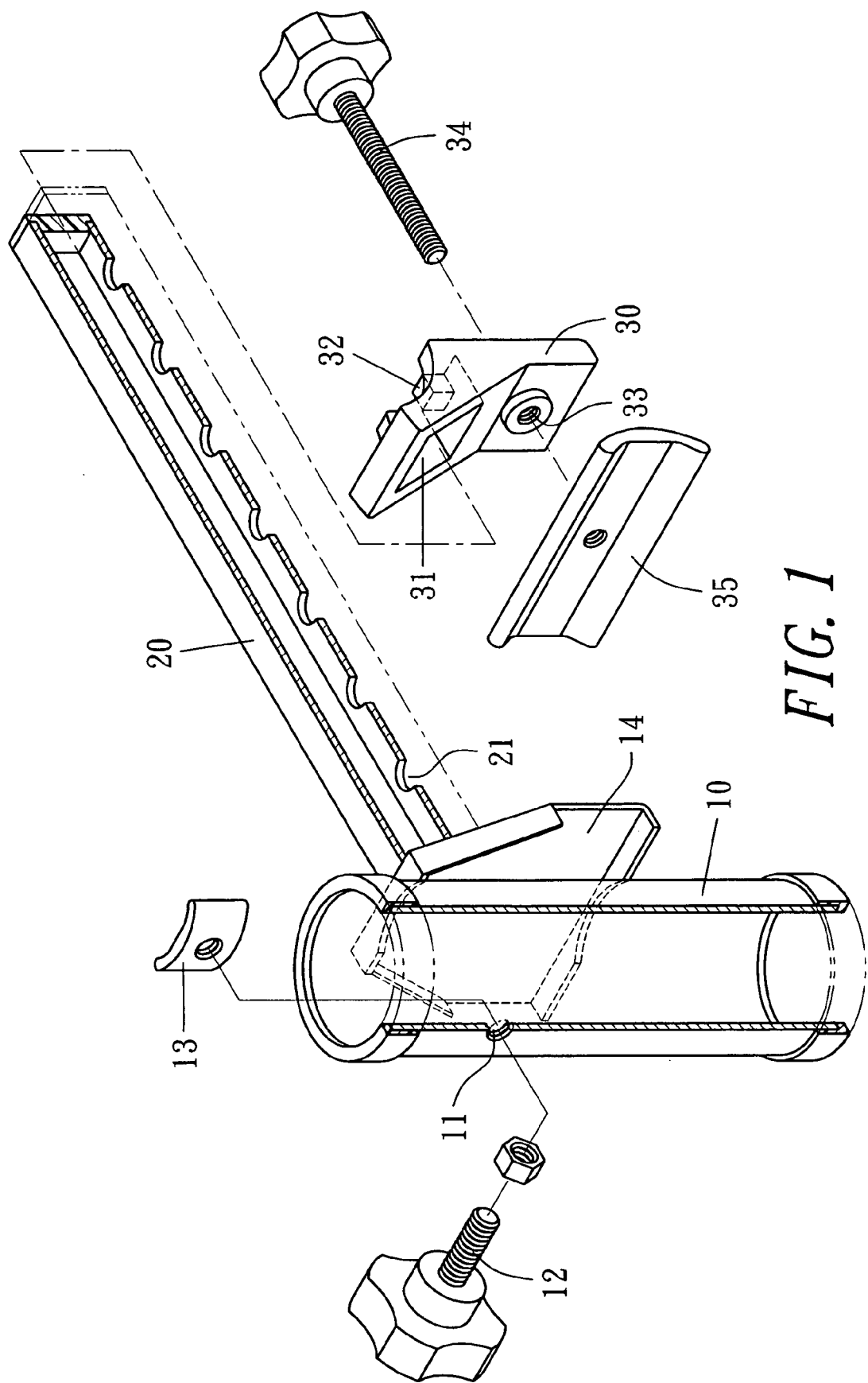
FIG. 1 is an exploded perspective view of a first embodiment of a striding shank fixing device in the present invention.
Figure 2:
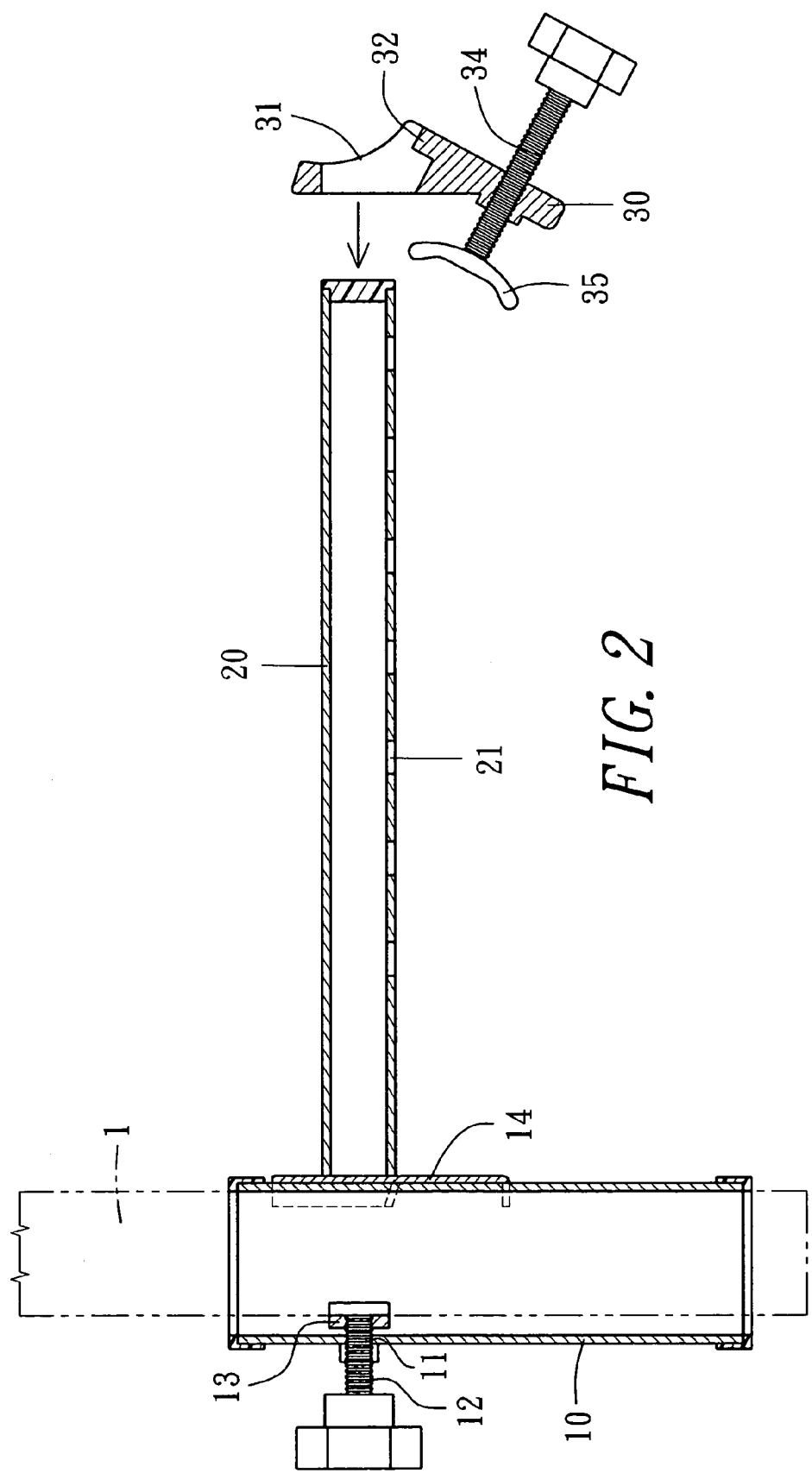
FIG. 2 is a cross-sectional view of the first embodiment of a striding shank fixing device in the present invention.

A first embodiment of a striding shank fixing device in the present invention, as shown in FIGS. 1 and 2, includes an insert tube 10, a guide tube 20, and an adjusting member 30 as main components combined together.

The insert tube 10 is straight, having its hollow interior for a shank 1 (like a flagpole or a shank of a parasol) to fit therein, a female-threaded hole 11 formed in a side for a thumb screw 12 to screw in the insert tube 10 so as to forcefully move inward a driving block 13 located in the insert tube 10 to press on the outer surface of the shank 1. Further, a fix plate 14 is attached firmly with the outer surface of the insert tube 10.

The guide tube 20 has its inner end fixed firmly with the fix plate 14, and the other end extending outward, provided with a plurality of position holes 21 spaced apart equidistantly in a lower side.

The adjusting member 30 has a hole 31 in an upper portion for the guide tube 20 to pass through, a projection 32 on an inner wall of the hole 31 to correspond to any of the position holes 21 of the guide tube 20, a female-threaded hole 33 formed in a lower portion for a thumb screw 34 to screw therein. The thumbscrew 34 has its end pressing against the fix plate 14, and a driving strip 35 is provided between the insert tube 10 and the fix plate 14.

Figure 3:
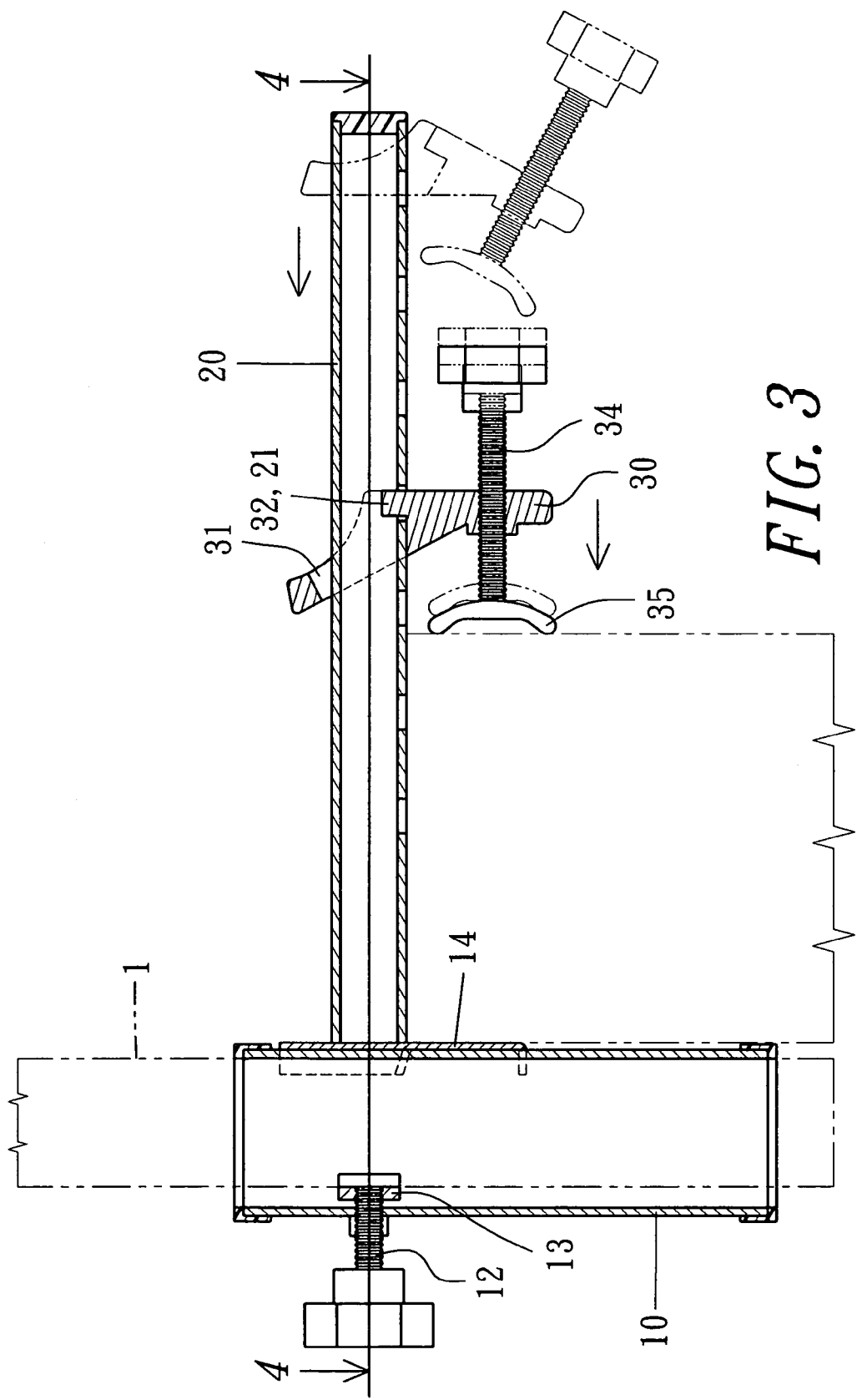
FIG. 3 is a cross-sectional view of the first embodiment of a striding shank fixing device fixed striding on a wall in the present invention.
Figure 4:
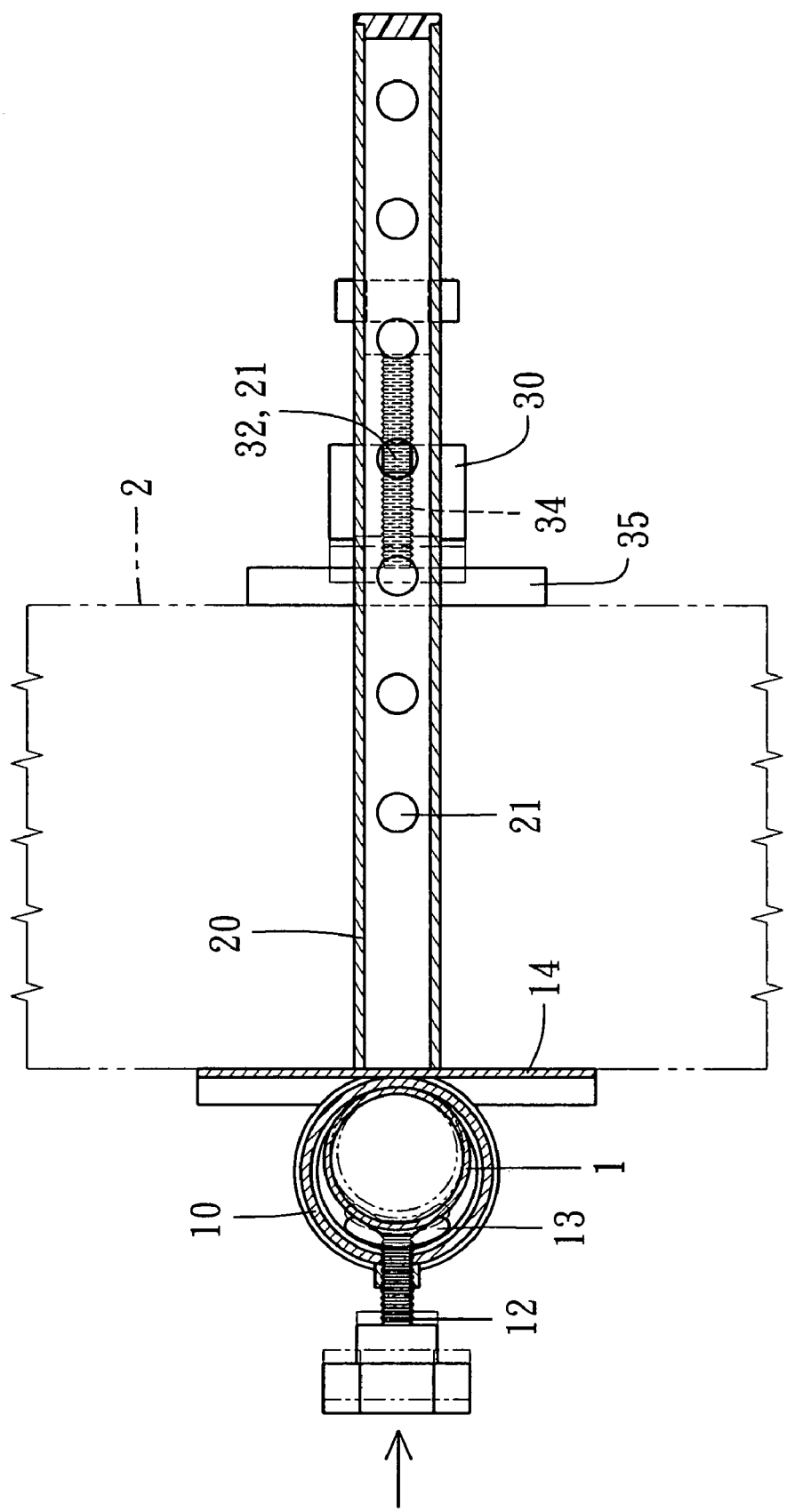
FIG. 4 is a cross-sectional view of the line 4-4 in FIG. 3.

After the striding shank fixing device is assembled together as shown in FIGS. 2 and 3, the guide tube 20 is inserted through the hole 31, and the angle of the adjusting member 30 is adjusted properly and then fixed on a vertical wall surface 2 by pulling the adjusting member 30 nearer to the vertical wall surface 2, and straightening the adjusting member 30 to force the projection 32 engage in one of the position holes 21 of the guide tube 20. Then screw inward the thumbscrew 34 and move the driving strip 35 to push tightly against the wall surface 2. Then the striding shank fixing device is secured striding on the wall surface 2. As shown in FIGS. 3 and 4, after the shank 1 is inserted in the insert tube 10, the thumb screw 12 is rotated inward to forcefully move the driving block 13 to push tightly against the shank 1 to the insert tube 10, securing the shank 1 stably therein. As the adjusting member 30 can be adjusted its location on the guide tube 20, it can be temporarily positioned securely at the adjusted point by making the projection 32 engage one of the position holes 21. So the shank-fixing device can be adjusted according to the thickness of the wall where it is to be secured, possible to stride on a wall and secured on a vertical surface of a wall with any thickness.

Figure 5:
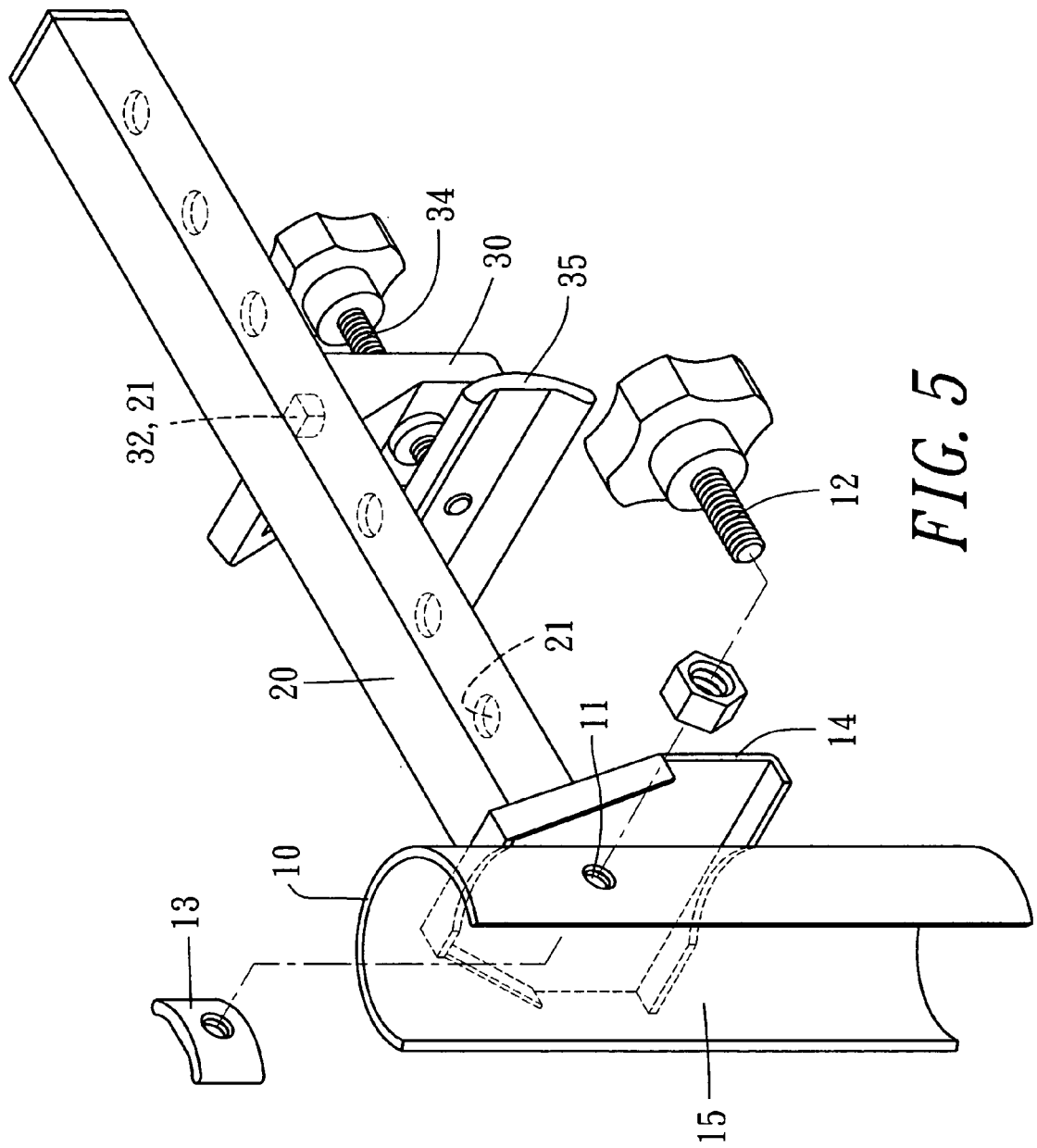
FIG. 5 is a perspective view of a second embodiment of a striding shank fixing device in the present invention; and, FIG. 6 is an upper cross-sectional view of the second embodiment of a striding shank fixing device in the present invention.
Figure 6:
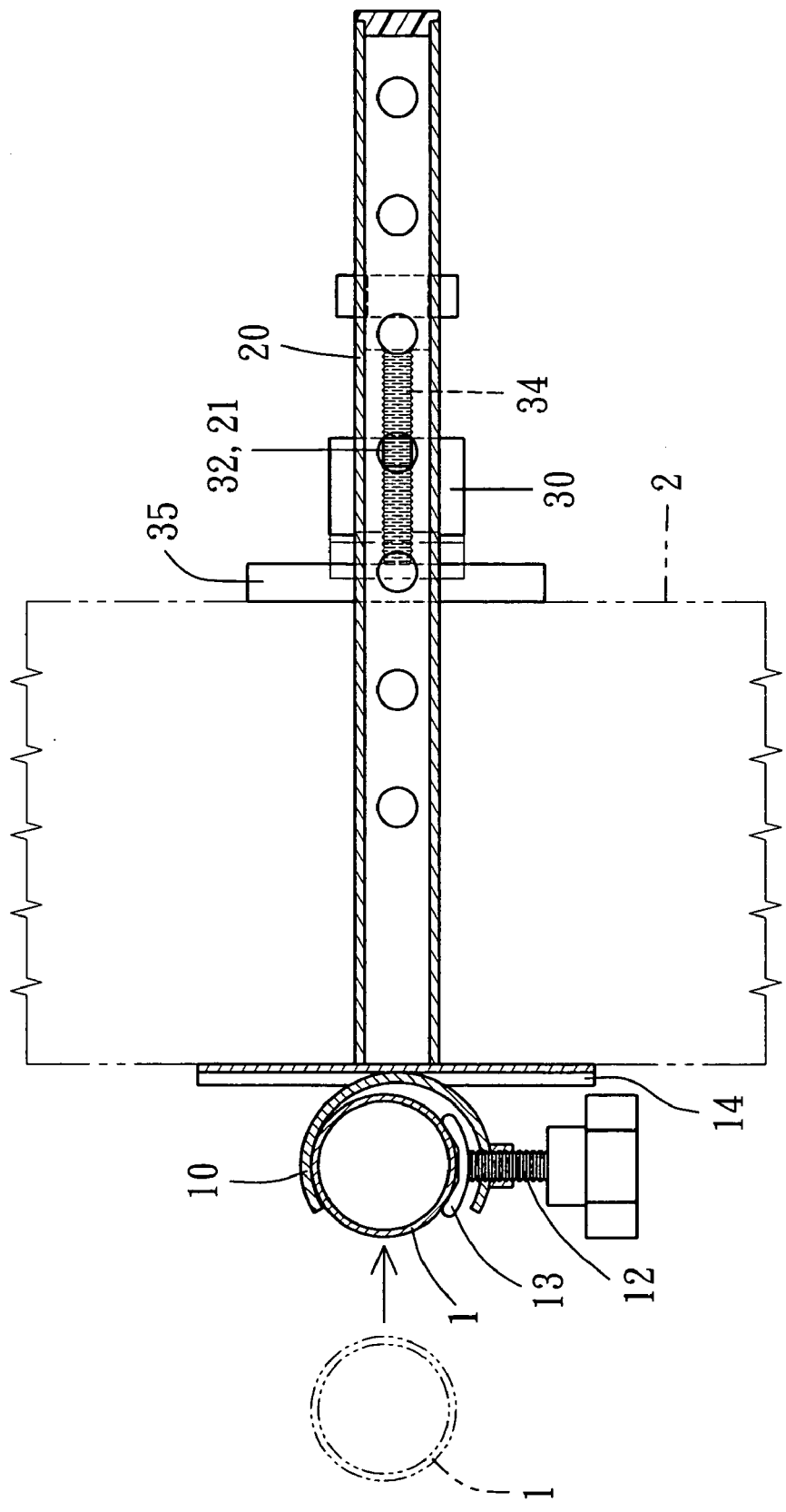

Next, FIGS. 5 and 6 show a second embodiment of a striding shank fixing device in the invention, which has almost the same structure as the first embodiment, except that the insert tube 10 has lengthwise opening 15 for a shank 1 of a parasol to pass through into the interior of the insert tube 10, without need to insert it from above into the insert tube 10, more convenient to handle and without any unstableness in inserting process.

While the preferred embodiments of the invention have been described above, it will be recognized and understood that various modifications may be made therein and the appended claims are intended to cover all such modifications that may fall within the spirit and scope of the invention.

What is claimed is:

1. A striding shank fixing device comprising:
   an insert tube of a straight shape for a shank of a parasol or a pole for a flag to be inserted therein, a thumb screw screwing sidewise in said insert tube, a driving block provided inside said insert tube for the end of said thumb screw to push against so as to push against said shank;

a guide tube located to extend horizontally outward from an outer surface of said insert tube, having a plurality of position holes spaced apart equidistantly in a lower side thereof;

an adjusting member having a hole in an upper portion for said guide tube thereof to pass through, a position projection provided on an inner side of said hole to fit in any of said position holes of said guide tube, a female-threaded hole formed in a lower portion thereof for a thumb screw to screw with for pressing a driving strip fixed on an outer surface of said insert tube;

said shank fixing device fixed to stride on a vertical wall, said insert tube and said adjusting member respectively located at two opposite sides of the wall, said adjusting member moved nearer to one vertical surface of the wall to enable said position projection to fit in the nearest of said position holes of said guide tube to secure stably said adjusting member at the adjusted location relative to said guide tube, said thumb screw of said adjusting member screwed inward to press said driving strip to push tightly against a vertical wall surface to secure said adjusting member with the wall so that said shank fixing device is secured striding on the wall for supporting the shank of a parasol.

2. The striding shank fixing device as claimed in claim 1, wherein said insert tube has a lengthwise opening in its wall to function as an entrance for a shank of a parasol to pass through into the interior of said insert tube.

* * * * *